US006519986B2

(12) United States Patent
Wicker

(10) Patent No.: US 6,519,986 B2
(45) Date of Patent: Feb. 18, 2003

(54) LOCKING DEVICE

(75) Inventor: Herbert Wicker, Kelkheim (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/388,835

(22) Filed: Sep. 1, 1999

(65) Prior Publication Data

US 2002/0157435 A1 Oct. 31, 2002

(30) Foreign Application Priority Data

Sep. 11, 1998 (DE) ........................................ 198 41 670

(51) Int. Cl.[7] ................................................ B60R 25/00
(52) U.S. Cl. ........................... 70/237; 70/264; 292/201; 292/216
(58) Field of Search ................................ 292/216, 201, 292/DIG. 23; 70/237–239, 263, 264, 275

(56) References Cited

U.S. PATENT DOCUMENTS 4,334,704 A * 6/1982 Yamada ...................... 292/216
4,492,395 A * 1/1985 Yamada ...................... 292/216
4,904,006 A * 2/1990 Hayakawa et al. ...... 292/216 X
5,046,769 A * 9/1991 Rimbey et al. ............. 292/216
5,066,054 A * 11/1991 Ingenhoven ................ 292/201
5,071,178 A * 12/1991 Brackman et al. .......... 292/216
5,454,608 A * 10/1995 Dzurko et al. .............. 292/216
5,615,564 A * 4/1997 Inoue ....................... 70/264 X
5,715,713 A * 2/1998 Aubry et al. ............ 70/264 X
5,794,992 A 8/1998 Yoneyama .................. 292/216
5,833,282 A * 11/1998 Ikeda ......................... 292/201
5,921,595 A * 7/1999 Brackmann et al. ........ 292/216
5,934,717 A * 8/1999 Wirths et al. ............... 292/201
5,961,163 A * 10/1999 Brackmann et al. ........ 292/201
6,050,620 A * 4/2000 Rogers et al. .............. 292/216
6,056,334 A * 5/2000 Petzold et al. .............. 292/216
6,062,615 A * 5/2000 Hunt et al. ............. 292/216 X
6,109,671 A * 8/2000 Roncin et al. .............. 292/216

FOREIGN PATENT DOCUMENTS

| | | |
|---|---|---|
| DE | 4129703 | 3/1993 |
| DE | 4228235 | 3/1994 |
| DE | 19512608 | 10/1996 |
| DE | 19611972 | 10/1996 |

* cited by examiner

*Primary Examiner*—Suzanne Dino Barrett
(74) *Attorney, Agent, or Firm*—Martin A. Farber

(57) ABSTRACT

A locking device, in particular for a vehicle, having a rotary catch (1), which encloses a locking bolt (2) and can be arrested or released by a pawl (7), the pawl (7), via a lever which is connected to a grip via connecting elements, being actuable by the grip, which locking device is distinguished by the fact that the at least one lever is mounted about a fixed pivot (8), at least one grip acting on the lever, which is formed as an actuating lever (17).

22 Claims, 3 Drawing Sheets

LOCKING DEVICE

FIELD AND BACKGROUND OF THE INVENTION

The invention relates to a locking device, in particular for doors, tailgates, trunk lids or the like.

DE 42 28 235 A1 discloses a locking device. In this locking device, the pawl is designed as a two-armed locking lever and can pivot about an axis of rotation. One lever arm of the pawl is provided with a driver and a detent. When the vehicle door is closed, the detent of the pawl engages in a detent of a rotary catch, the inner leg of which engages behind a locking bolt fixed to the body. The other lever arm of the pawl is directed obliquely upward and has a contact surface on its end section. The first arm of the lever of the locking device is directed downward and has on its end a projection with a driving surface and an angular surface. The second arm of the lever is arranged approximately horizontally and has a widened portion on its end, the inner surface of which widened portion is designed as a contact surface. An actuating rod of the locking device acts on the axis of rotation of the lever. This actuating rod is guided in a guide and is supported relative to the lever via a leg spring.

In the functional position "unlocked", the lever is displaced upward in parallel by pulling the actuating rod in the upward direction and pivots the pawl clockwise via the driving surface and the driver, as a result of which the spring-loaded rotary catch is released counterclockwise.

Such an arrangement has the disadvantage that the pivot of the lever is displaced on account of the upward movement of the actuating rod, as a result of which the pivot shifts on account of this upward movement, but the accurate position of the pivot is required for the unlocking. In order to ensure exact orientation of the driving surface and the angular surface on the projection of the first arm of the lever, since these surfaces engage behind the driver on the pawl and the pawl is thus actuated, the positions of the pawl and the lever must be matched to one another very accurately, since driving is to be effected in the functional position "unlocked"; however, this driving, by disengagement, is not to be effected in the functional position "centrally locked". Therefore the actuating rod, which carries the pivot of the lever at its end, must also be mounted and guided very accurately, so that the two positions of the lever can perform the corresponding functions on the pawl. In addition to very accurate guidance of the actuating rod, this also requires a correspondingly solid design of the actuating rod and its guide, so that this construction is very expensive and heavy.

SUMMARY OF THE INVENTION

The object of the invention is therefore to provide a locking device of the type described at the beginning which is of more effective construction while retaining the functional positions described.

According to the invention, provision is made for the at least one lever to be mounted about a fixed pivot, at least one grip acting on the lever, which is formed as an actuating lever. The arrangement of a fixed pivot, about which the lever is rotatably mounted, has the advantage that this pivot may already be provided in a housing of the locking device and does not change, the lever merely being slipped onto this pivot, so that the assembly is also simplified. With regard to the movement of the lever, this lever only performs a rotary movement, so that there is only one degree of freedom for the lever, as a result of which the latter can be set in a precisely defined manner. This precisely defined setting is effected between at least two positions, one position being fixed by a fixed stop. This stop may in turn also be provided in the housing of the locking device. Conceivable at this point are also two levers, which are pivotable about the same fixed pivot or different fixed pivots, in each case a grip (such as, for example, a door exterior handle and a door interior handle) acting on each lever. If there is only one lever with a grip, this type of locking device can be used in a trunk lid or a tailgate of a vehicle, where only an external actuation is required.

In a development of the invention, the actuating lever has two ends, which are connected to one grip each via connecting elements, in particular actuating rods. These two ends are arranged approximately symmetrically to the pivot of the actuating lever, the grip, designed as door interior handle or as door exterior handle, acting on one end in each case, so that, by means of the locking device according to the invention, which is arranged in a door or the like of the vehicle, this door can be opened from both the inside and outside.

In a development of the invention, elongated holes, in which pins of the connecting elements are longitudinally movable, are made in the ends of the actuating lever. This design has the advantage that, when one grip is actuated, the other grip is not moved with it and vice versa.

In a development of the invention, a coupling lever movable by an actuator is arranged on the pawl or on the actuating lever. This coupling lever causes the force-transmission path between a grip and the pawl to be closed or interrupted, so that, when the force-transmission path is closed, the actuation of a grip also produces an actuation of the pawl. When the force-transmission path is interrupted, an actuation of a grip effects an idle stroke of the actuating lever, so that the pawl cannot be actuated by means of the actuating lever. The actuator is activated as a function of a setting desired by an operator of the vehicle, in which case the operator, for example via a remote control or via a locking cylinder or other means, can bring the locking device into the functional positions "unlocked", "centrally locked" or also into the functional position "secured against theft".

In a development of the invention, the coupling lever can be moved by the actuator via a lever system. This lever system enables the pawl to be actuated by both grips in the functional position "unlocked"; if the functional position "centrally locked" is set, the lever system enables the pawl to be actuated by means of the actuation of the door interior handle, but not during actuation of the door exterior handle.

In a development of the invention, the lever system has two levers restrained relative to one another. This design of the lever system with two levers movable as a function of one another or independently of one another has the advantage that both the functional position "unlocked" and the functional position "centrally locked" can thus be realized. The preloading of the two levers relative to one another is realized in particular with a retaining spring, which is to be arranged around a pivot of the two levers in a small construction space. Instead of a spring acting on both levers, springs (tension or compression springs) which are separate from one another may also be used, and these springs each act on one of the levers.

In a development of the invention, the first lever of the lever system is connected to a grip, in which case, in a further refinement of the invention, the second lever can be set via a control disk, which can be driven by the actuator, in particular an electric motor. This ensures that at least one lever of the lever system can always be actuated during an actuation of a grip (in particular the door interior handle), so that it is always possible in the two functional positions "unlocked" and "locked" to leave the vehicle from the interior space by actuating the door interior handle. Via the control disk, which is brought into various positions by the actuator, it is now possible to move the second lever of the lever system in such a way that an actuation of the other grip (in particular the door exterior handle) in the functional position "unlocked" leads to opening of the door, and this grip performs an idle stroke in the functional position "centrally locked" and the door cannot be opened. Suitable means (for example switches, potentiometers or the like) detect when a desired position of the control disk is reached, and the actuator is accordingly switched off when the desired position of the latter is reached.

Further refinements of the locking device according to the invention are specified in the remaining subclaims, from which the corresponding advantages result.

In a further refinement of the invention, the pawl has an end on which a locking cylinder acts, so that, by means of the actuation of the locking cylinder via a key, it is always possible, for example in the event of a failure of the actuator or a malfunction of an element of the locking device (for example jamming), to open the door from outside (or also from inside if the locking cylinder is attached in the interior space of the vehicle).

BRIEF DESCRIPTION OF THE DRAWINGS

An exemplary embodiment of a locking device according to the invention is described below and explained with reference to the figures, in which case the geometric dimensions and shapes shown in the figures are only exemplary and may be appropriately adapted to the use, purpose and construction space without departing from the invention. In the drawings.

DETAILED DESCRIPTION OF THE PREFERRED EMBODIMENT

Figure 1:
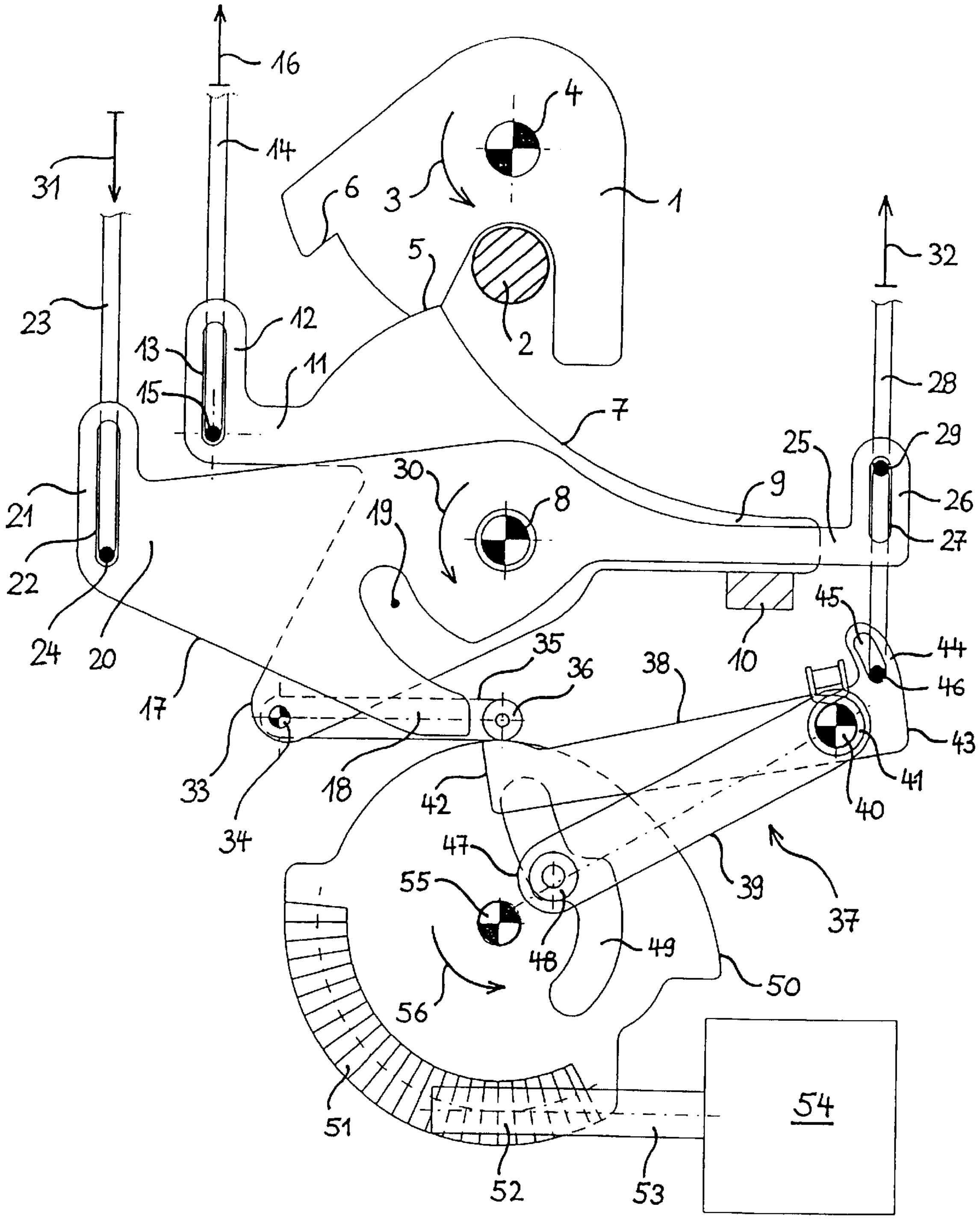
FIG. 1: shows a locking device in the functional position "unlocked"
Figure 2:
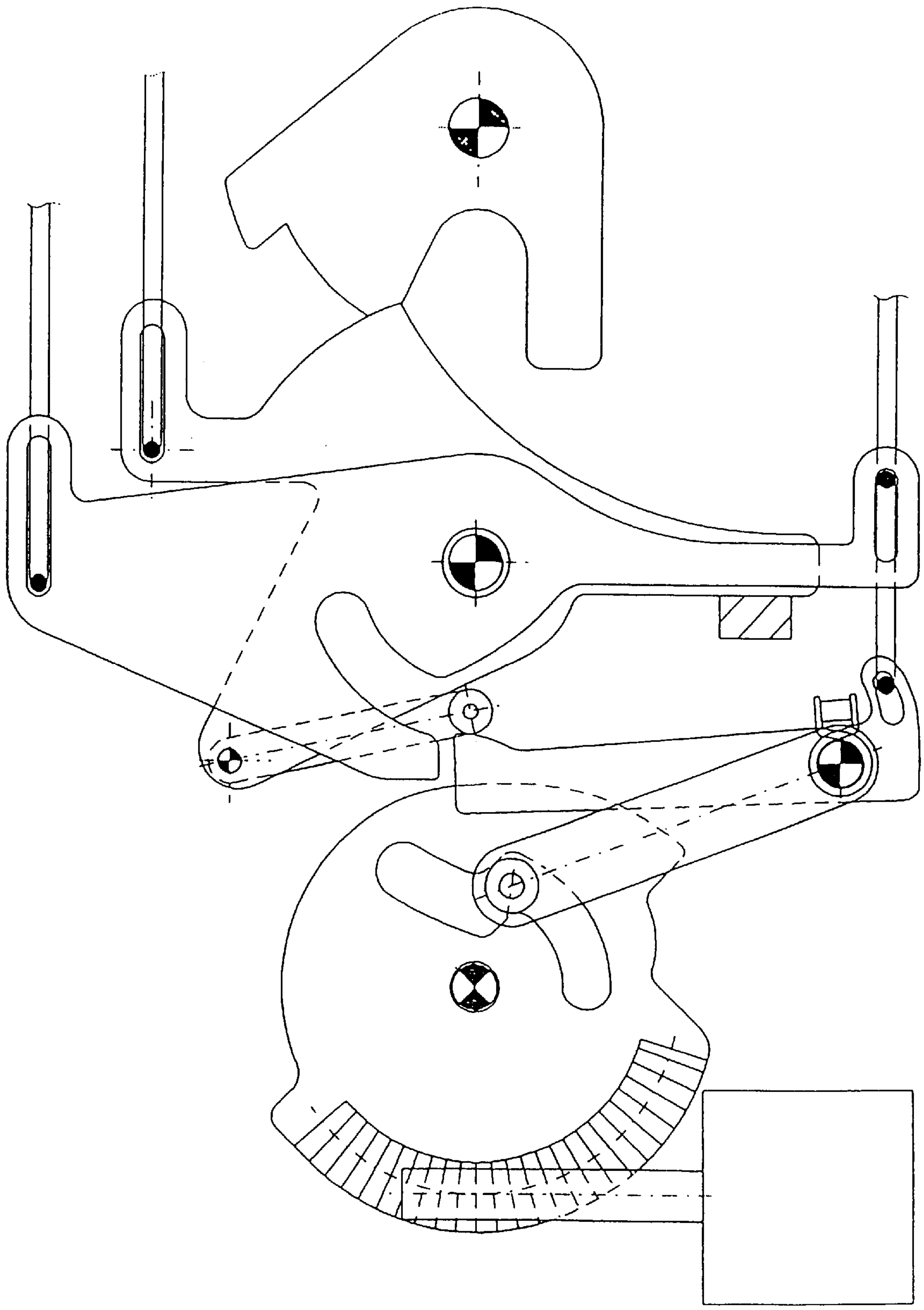
FIG. 2: shows a locking device in the functional position "centrally locked
Figure 3:
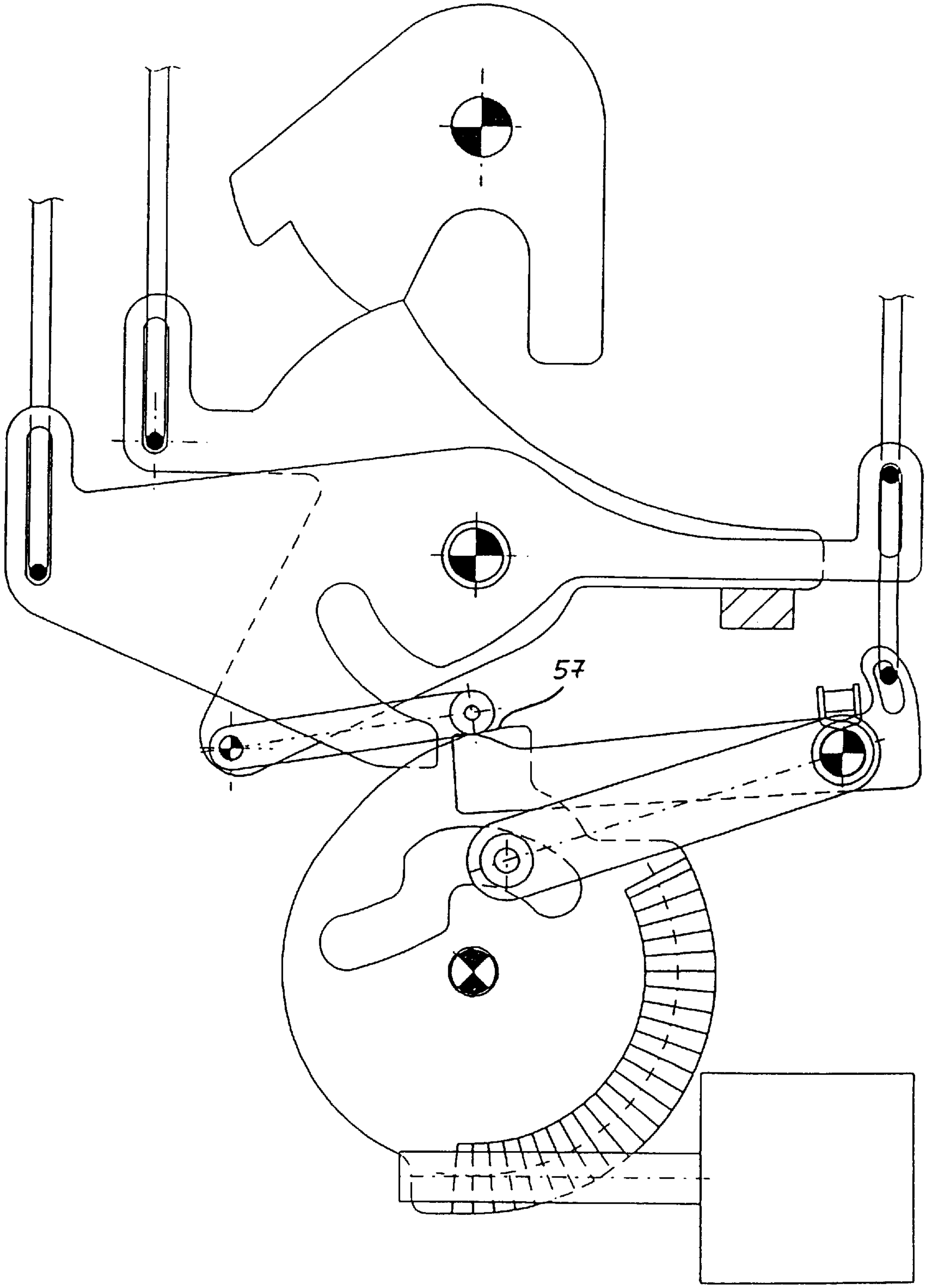
" and FIG. 3: shows a locking device in the functional position "secured against theft".

The elements shown in FIGS. 1 to 3 are the same elements repeated in each case and have only been provided with reference numerals in FIG. 1, FIGS. 1 to 3 differing only in the position of some functional elements, this being explained below.

FIG. 1 shows a locking device which has a rotary catch 1, the rotary catch 1 enclosing a locking bolt 2 in the arrested postion in FIG. 1. The locking bolt 2 is, for example, arranged in a fixed position on the body of a vehicle, whereas the rotary catch 1 and the other elements to be described below are arranged in the door of the vehicle. The opposite arrangement is also possible, that is to say that the locking bolt 2 is arranged in the door, whereas the other elements are arranged on or in the body of the vehicle.

The rotary catch 1 can be rotated out of its arresting position shown in a direction of rotation 3 about a pivot 4 in such a way that the locking bolt 2 enclosed by the two legs of the rotary catch 1 can be moved out of this enclosure. The rotary catch 1 also has a main detent 5 and a preliminary detent 6, only the main detent 5 being absolutely necessary in order to hold the door or the like in its locking position. A preliminary latch 6 may be available for use for reasons of comfort or on account of statutory regulations, but need not be available.

The rotary catch 1 is held in its arresting position shown in FIG. 1 by a pawl 7, one end of the pawl 7 being in operative connection with the main detent 5, so that the rotary catch 1 cannot move in the direction of rotation 3. The pawl 7 is mounted so as to be rotatable about a pivot 8, in which case it may also be mentioned that the rotary catch 1 and/or the pawl 7 may be loaded by spring force. In this case, the rotary catch 1 would be loaded by spring force in the direction of its arrested position and the pawl 7 would be loaded by spring force in the direction of the main detent 5.

The pawl 7 has at least one lever-like end 9, the pawl 7, with this lever-like end, coming into contact with a stop 10, which, for example, is a component of a housing in which the locking device is accommodated. A projection 12 is provided on an end 11, which is approximately opposite the lever-like end 9 (relative to the pivot 8), the projection 12 having an elongated hole 13. On an actuating rod 14, a pin 15 is arranged on one end of the actuating rod 14, the pin 15 being longitudinally movable in the elongated hole 13.

The actuating rod 14, starting from the position shown in FIG. 1, can be moved in an actuating direction 16 and back into the initial position. A locking cylinder, for example, is arranged at that end of the actuating rod 14 which is remote from the pin 15, in which case, by insertion of a key into the locking cylinder, which is arranged in the door for example, the pawl 7 can be actuated by means of this key and thus the locking device can be actuated for locking or opening the door.

Furthermore, an actuating lever 17, the geometric design and function of which is explained below, is mounted about the pivot 8 (alternatively also about another pivot).

The actuating lever 17 has a leg 18 and thus forms a recess 19 in the region of the pivot 8, the significance of which recess 19 will be explained in connection with the actuator and the setting of the various functional positions.

On an end remote from the pivot 8, the actuating lever 17—in a similar manner to the pawl 7—has a projection 21, which again is provided with an elongated hole 22, and here too a pin 24, which is movable in the longitudinal direction in the elongated hole 22, is again arranged on an actuating rod 23 on one end of this actuating rod 23. At the end remote from the pin 24, the actuating rod 23 is connected to a grip, in particular a door exterior handle.

Furthermore, the actuating lever 17, on the side remote from the end 20, has approximately symmetrically to the pivot 8 a further end 25, which in the same way has an elongated hole 27 in a projection 26. Here, too, an actuating rod 28 is provided with a pin 29, the pin 29 being movable inside the elongated hole 27. Unlike the actuating rod 23, the pin 29 of the actuating rod 28 does not sit at its end but in the course of the actuating rod 28, the design of the end of the actuating rod 28 likewise being explained in connection with the actuator. The end of the actuating rod 28 remote from this end is connected to a further grip, in particular a door interior handle (and/or an internal security button).

The actuating lever 17, starting from its position shown in FIG. 1, is rotatable in a direction of rotation 30 by actuation of one of said grips. The initial position of the actuating lever 17 is established by virtue of the fact that the actuating lever 17, with its end 25, is likewise in contact with the stop 10. This contact may also be again defined by spring-force loading, so that the actuating lever 17 can be deflected in the direction of rotation 30 only against the force of a spring (not shown—a tension or compression spring, a torsion spring arranged about the pivot 8, a retaining spring or the like). This is effected by the actuation of the door exterior handle in an actuating direction 31, so that the pin 24 comes into contact with one end of the elongated hole 22 and can deflect the actuating lever 17 in the direction of rotation 30. The same applies to the actuation of the door interior handle in an actuating direction 32, so that here, too, the pin 29 comes into contact with the projection 26 at the end of the elongated hole 27, as a result of which the actuating lever 17 can likewise be deflected in the direction of rotation 30. The use of at least the two elongated holes 22 and 27 is intended to ensure that, when one grip is actuated, the other grip is not moved along with it, and vice versa. For the sake of completeness, it may also be mentioned that both the actuating rod 23 and the actuating rod 28 need not necessarily be of rigid design, so that these rods may also be designed as Bowden cables or the like or as a combination of a rigid and a flexible connecting element.

The pawl 7 has a pivot 34 at a further end 33 (in which case the lever-like end 9, the end 11 and the end 33 are arranged approximately in a triangular shape relative to the pivot 8, but do not have to be arranged in such a way), a coupling lever 35 being arranged around the pivot 34. This coupling lever 35, at its end remote from the pivot 34, has a coupling-lever pin 36, which is designed in one piece with the coupling lever or forms a separate component. If the coupling lever 35 and the coupling-lever pin 36 are of one-piece design, the coupling-lever pin 36 may be produced, for example, by bending part of the coupling lever 35.

If the coupling lever 35 and the coupling-lever pin 36 form two components, the coupling-lever pin 36 may be arranged, for example, rigidly on the coupling lever 35 but rotatably in itself.

The coupling lever 35 can be moved about the pivot 34 by a lever system 37, so that the individual functional positions "unlocked", "centrally locked" and "secured against theft" are realized by the pivoting of the coupling lever 35 and by different settings of the lever system 37.

The lever system 37 consists of a first lever 38 and a second lever 39, the second lever 39 being mounted so as to be rotatable about a common pivot 40 with or on the first lever 38. The first lever 38 and the second lever 39 are restrained relative to one another in the region of the common pivot 40 by means of a retaining spring 41. The significance of the spring-force loading will likewise be explained in connection with the mode of operation of the actuator.

The first lever 38 is located with its first end 42 in the region of the coupling lever 36 and thus, due to its deflection about the common pivot 40, is also able to deflect the coupling lever 35 about the pivot 34. At its other end 43, the first lever 38 again has a projection 44 in which an elongated hole 45 is arranged. A pin 46 is movable in this elongated hole 45, the pin 46 now being located at the end of the actuating rod 28. Thus, by means of the actuation of the door interior handle, not only is a movement of the actuating lever 17 about the pivot 8 possible, but so too is a deflection of the lever system 37 about the common pivot 40.

At its end 47 which is remote from the common pivot 40, the second lever 39 has a pin 48, in which case this pin 48, to avoid wear phenomena, may also be designed as a roller rotatably fastened to the second lever 39. This pin 48 (or this roller) engages in a recess 49 of a control disk 50, in which case, instead of the recess 49, the contours for guiding the pin 48 may also be designed as appropriately shaped webs on the control disk 50. The control disk 50, on part of the periphery, has a worm segment 51, the worm segment 51 meshing with a worm 52, which is arranged on a motor shaft 53 of an electric motor 54, which forms the actuator. The electric motor 54, starting from the position shown in FIG. 1, is thus able to move the control disk 50 about a pivot 55, at which the control disk 50 is mounted, in a direction of rotation 56 into at least one further position and back again.

Before the mode of operation of the locking device shown in FIGS. 1 to 3 is dealt with, the following elements which are important for the functional mode but are not shown in the figures will be described. The electric motor 54 is electrically connected to a control unit, this control unit receiving input signals which detect the actuation of a grip. These means for detecting the actuation of a grip may be, for example, switches which are arranged in the door interior handle or the door exterior handle, or else switches, switching contacts or the like as well as devices which act in a non-contact manner are used and detect the movement of, for example, one of the actuating rods 23 and 28 or also the deflection of the actuating lever 17. In addition, the control unit is also provided with means which transmit the command as to which functional position is to be set to the control unit, so that the electric motor 54 (or the actuator in general) can be activated by the control unit and thus the control disk 50 can be brought into the corresponding position. These means may again be, for example, switching contacts on a locking cylinder, in which case these means may alternatively or additionally be designed as a wireless remote control.

The mode of operation of the locking device is as follows:

The functional position "unlocked" is shown in FIG. 1, this functional position signifying that the door, the tailgate, the trunk lid or the like can be opened by means of the actuation of either the door exterior handle or the door interior handle. In concrete terms, this means that the pin 24 comes into contact with the actuating lever 17 by actuation of the door exterior handle, as a result of which the actuating lever 17 is moved in the direction of rotation 30. The result of this is that the end of the leg 18 of the actuating lever 17 comes into contact with the coupling-lever pin 36, so that, by this contact, the force-transmission path from the door exterior handle to the pawl 7 is closed via the coupling lever 35, so that the pawl 7 is thereby also moved in the direction of rotation 30 about the pivot 8 and is brought out of the region of the main detent 5 (and also of the preliminary detent 6 if present), so that it is possible for the rotary catch 1 to move in the direction of rotation 3 and open the locking bolt 2. Therefore the door or the like can be opened after actuation of a grip. The same applies to the actuation of the door interior handle, in which case the pin 29 comes into contact with the end of the elongated hole 27, as a result of which the action already described is initiated and the rotary catch 1 is released. During this action described, the lever system 37, in particular the other end 43 of the first lever 38, assumes such a position that the coupling lever 35 is brought into such a position that there is a connection and thus a force transmission from the leg 18 of the actuating lever 17 via the coupling-lever pin 36 and the coupling lever 35 to the pawl 7. In this case, detection of the actuation of a grip by means of an associated switch has no effect on the activation of the electric motor 54 by the control unit. Due to the arrangement of the pins 29 and 46 on the actuating rod 28, the actuating lever 17 is moved out of the position shown in FIG. 1 about the pivot 8 in the direction of rotation 30 when the actuating rod is actuated, while the first lever 38 remains stationary on account of the elongated hole 45, in which the pin 46 can move freely. Thus the door can be opened from inside. Locking can also be carried out if the actuating rod 28, as viewed in FIG. 1, is moved downward. In this case, the pin 29 moves freely in the elongated hole 27 of the actuating lever 17, which is not moved. Only the first lever 38 with its end 43, as viewed in FIG. 1, is moved downward and thus the coupling-lever pin 36 of the coupling lever 35 is moved out of the pivoting region of the leg 18 of the actuating lever 17. Actuation of the door exterior handle thus leads to an idle stroke, whereas actuation of the door interior handle cancels the locking just described.

FIG. 2 shows the locking device according to FIG. 1, the functional elements already described and shown in FIG. 1 being located in FIG. 2 in such a position which corresponds to the functional position "centrally locked". In this functional position, the elements of the locking device are set in such a way that the actuation of the door exterior handle does not lead to a movement of the pawl 7 about the pivot 8, but an actuation of the door interior handle leads to an actuation of the pawl 7 and thus to opening of the door or the like. This functional position "centrally locked" is set, for example, when the occupants have got into the vehicle and set off. After a certain speed threshold has been exceeded, in which case a signal from a speed sensor is also fed to the control unit, the electric motor 54 is activated by the control unit and moves the control disk 50 in the direction of rotation 56 about the pivot 55 into the second position shown in FIG. 2. On account of the geometric design of the recess 49, a rotation of the control disk 50 causes the pin 48 to follow this recess 49 and thus lift both the second lever 39 and the first lever 38, as viewed in FIG. 2, so that the first end 42 of the first lever 38 thereby moves the coupling-lever pin 36 out of the effective region of the leg 18. The result of this is that an actuation of the door exterior handle, which causes an actuation of the actuating rod 23 in the actuating direction 31, cannot lead to an actuation of the pawl 7, since the leg 18 cannot come into contact with the coupling-lever pin 36, so that an idle stroke is performed during actuation of the door exterior handle. Thus the door cannot be opened from outside in the functional position "centrally locked".

By the transposition of the lever system 37 from the initial position shown in FIG. 1 into the second position shown in FIG. 2 by activation of the electric motor 54, the pin 46 has also moved from one end of the elongated hole 45 to its other end, so that, during actuation of the door interior handle, in accordance with an actuation of the actuating rod 28 in the actuating direction 32, the pin 46 can now deflect the first lever 38 counterclockwise about the common pivot 40, in the course of which it is necessary to overcome the spring force of the retaining spring 41. After the spring force (spring 41) has been overcome, only the first lever 38 moves back counterclockwise into the position shown in FIG. 1, so that the coupling-lever pin 36 is again located in the effective region of the leg 18 and the door can be unlocked and thus opened in the way already described with reference to FIG. 1. On account of the geometric design of the recess 49, the second lever 39, on account of the contact of the pin 48 with a contour of the recess 49, is secured in position during this action and is not moved.

In FIG. 3, the elements of the locking device are shown in a position which corresponds to the functional position "secured against theft". In this functional position, it is to be ensured that the door cannot be opened either by actuation of the door exterior handle or by actuation of the door interior handle. For this purpose, the electric motor 54 is again activated by the control unit and moves the control disk 50 into a third position shown in FIG. 3. This is done, for example, when the vehicle is to be parked and left, for which purpose appropriate information has been transmitted to the control unit, for example via the remote control. The activation of the electric motor 54 and thus the rotation of the control disk 50 into the third position shown in FIG. 3 causes the first lever 38 to be moved into such a position as already shown in FIG. 2, so that the coupling-lever pin 36 is moved out of the effective region of the leg 18 of the actuating lever 17. At the same time, the second lever 39 is also moved clockwise about the common pivot in the direction of the first lever 38, so that the first end 42 of the first lever 38 and the end 47 of the second lever 39 approach one another. At the same time, an outer contour 57 of the control disk 50 causes the coupling-lever pin 36 to come into contact with this outer contour 57 and thus the leg 18 of the actuating lever 17 cannot pass into the effective region of the coupling-lever pin 36 by actuation of either the door exterior handle or the door interior handle, so that only an idle stroke can be performed by a handle, but this idle stroke does not lead to opening of the door. Whereas the radius of the control disk 50, starting from the pivot 55, in the region of the coupling-lever pin 36 in the first and second positions (in accordance with FIG. 1 and FIG. 2) was identical, this radius in the region of the outer contour (that is, in the third position of the control disk 50) between the pivot 55 and the outer contour 57 is now greater than in the other two positions. In this arrangement, the first-mentioned radius is to be selected in such a way that, in these two positions of the control disk 50, the coupling-lever pin 36 cannot be moved out of the effective region of the leg 18 by the outer contour of the control disk 50, the radius in the third position being selected to be so large that the coupling-lever pin 36 is moved out of the effective region of the leg 18 of the actuating lever 17 by means of the outer contour 57.

For better understanding of the geometric design, it may also be pointed out that the leg 18 and the first end 42 of the first lever 38, as viewed in the figures, are located in different planes, the coupling-lever pin 36 extending beyond these planes, so that the end of the leg 18, during deflection of the actuating lever 17 in the direction of rotation 30 about the pivot 8, could not hit the first end 42 of the first lever 38 and thus prevent a further movement of the actuating lever 17.

The locking device according to the invention thus has the advantage that said functional positions can be set without problem, opening of the door from inside, that is from within the vehicle, always being possible in the functional positions "unlocked" and centrally locked". Should the electric motor 54 fail or should a fault occur during its activation, the locking device, in the functional position "centrally locked", can still be unlocked from outside by means of a key, which is put into a locking cylinder and is connected to the actuating rod 14. The same also applies if the locking device is in the functional position "secured against theft", since in this functional position the grips (door exterior handle, door interior handle) are in any case uncoupled from the pawl 7 and perform an idle stroke. Since the functional position "secured against theft" may only be capable of being set from outside the vehicle, it is therefore also appropriate to actuate the locking device either only with a correctly working remote control in the normal case or by means of a key in the event of a malfunction.

As regards the significance of the means for detecting the actuation of the grips (such as, for example, microswitches on the door handle or the like), the following may be stated:

It is assumed that the locking device is in the functional position "secured against theft" (FIG. 3). If the operator of the vehicle now gives an unlocking command to the control unit, the two following procedures are conceivable. The control command for the opening first of all only causes the microswitch to be activated, that is to say that, after actuation of a grip, this actuation is detected by means of the microswitch and as a function of the latter the control unit activates the electric motor 54, which then brings the locking device into the functional position "unlocked". The door can thus be opened. On the other. hand, it is conceivable that the control unit already activates the electric motor 54 with the transmission of the control command for the opening and brings the locking device into the functional position "unlocked", so that the door can then be opened with actuation of a grip.

Childproof locking can also be realized with the locking device according to the invention, for which purpose, when the locking device is fitted into the rear doors of the vehicle, the door interior handle is fixed to the actuating rod 23 and the door exterior handle is fixed to the actuating rod 28. It is thus possible, in accordance with the functional position "centrally locked" shown in FIG. 2, to realize the childproof locking, since in this functional position the actuation of the door interior handle now leads to an idle stroke, whereas the actuation of the door exterior handle causes the door to open.

If the electric motor 54, its activation, its power supply or its downstream mechanism (such as, for example, the worm gear) should ever fail, the recess 49 has an extension, which is directed upward as viewed in the figure and into which the pin 48 of the lever 39 can move in order to be able to actuate the locking device manually.

It goes without saying that the locking device shown in the figures is accommodated in a housing, which is designed in particular to be dustproof and dampproof, it also being conceivable that the elements of the locking device are arranged on a so-called lock plate or may even be mounted in the door or the like or in the body.

LIST OF REFERENCE NUMERALS

1 Rotary catch
2 Locking bolt
3 Direction of rotation
4 Pivot
5 Main detent
6 Preliminary detent
7 Pawl
8 Pivot
9 Lever-like end
10 Stop
11 End
12 Projection
13 Elongated hole
14 Actuating rod
15 Pin
16 Actuating direction
17 Actuating lever
18 Leg
19 Recess
20 End
21 Projection
22 Elongated hole
23 Actuating rod
24 Pin
25 End
26 Projection
27 Elongated hole
28 Actuating rod
29 Pin
30 Direction of rotation
31 Actuating direction
32 Actuating direction
33 End
34 Pivot
35 Coupling lever
36 Coupling-lever pin
37 Lever system
38 First lever
39 Second lever
40 Common pivot
41 Retaining spring
42 First end
43 Other end
44 Projection
45 Elongated hole
46 Pin
47 End
48 Pin
49 Recess
50 Control disk
51 Worm segment
52 Worm
53 Motor shaft
54 Electric motor
55 Pivot
56 Direction of rotation
57 Outer contour

I claim:

1. A locking device, in particular for a vehicle, having a rotary catch (1), which encloses a locking bolt (2) and is able to be arrested or released by a movable pawl (7), the pawl (7) being actuable by an exterior handle or an interior handle grip, whereby the grips are connected by connecting elements to a lever and the lever is connected to he pawl (7), wherein the lever is movably mounted about a fixed pivot (8), said grips operatively acting on the lever, said lever being an actuating lever (17) having two ends (20,25) each connected to one of said grips, by said connecting elements, wherein said connecting elements include first and second actuating rods (23,28), and a coupling lever (35), movable by an actuator, is connected on the movable pawl (7) or engageable on the movable actuating lever (17), wherein said coupling lever (35) is movable by the actuator using a lever system (37), said lever system (37) includes a first lever (38) and a second lever (39) preloaded relative to one another, and said first lever (38) of the lever system (37) is operatively connected to one of said grips.

2. The locking device as claimed in claim 1, wherein elongated holes (22, 27), in which pins (24, 29) of the connecting elements are able to be moved longitudinally, are formed in the ends (20, 25).

3. The locking device as claimed in claim 1, wherein one of the levers (39) of the lever system is able to be set by a control disk (50), said control disk is able to be driven by the actuator, in particular an electric motor (54).

4. The locking device as claimed in claim 3, wherein the control disk (50) has a recess (49), in which a pin (48) arranged on one end (47) of said one of said levers (39) engages.

5. The locking device as claimed in claim 3, wherein the control disk (50) has an outer contour (57), with which the coupling lever (35), in particular by a coupling lever pin (36) arranged on the coupling lever (35), is able to be moved from one position into another position.

6. The locking device as claimed in claim 3, wherein the control disk (50) is able to be driven by the actuator in a geared-down manner.

7. The locking device as claimed in claim 1, wherein an end of the pawl (7) is acted upon by a locking cylinder, in particular by a connecting element.

8. The locking device as claimed in claim 1, wherein a control disk (50) engaging the coupling lever (35) is able to be driven by the actuator in a geared-down manner.

9. The locking device as claimed in claim 1, wherein said coupling lever (35) is operatively connected to said actuating lever and said pawl.

10. The locking device as claimed in claim 1, wherein said second lever (39) of the lever system is able to be set by a control disk (50), said control disk is able to be driven by the actuator, in particular an electric motor (54).

11. A locking device, in particular for a vehicle, having a rotary catch (1), which encloses a locking bolt (2) and is able to be arrested or released by a movable pawl (7), the pawl (7) being actuable by an exterior handle or an interior handle grip, whereby the grips are connected by connecting elements to a lever and the lever is connected to he pawl (7), wherein the lever is movably mounted about a fixed pivot (8), said grips operatively acting on the lever, said lever being an actuating lever (17) having two ends (20,25) each connected to one of said grips, by said connecting elements, wherein said connecting elements include first and second actuating rods (23,28), and a coupling lever (35), movable by an actuator, is connected on the movable pawl (7) or engageable on the movable actuating lever (17), wherein said coupling lever (35) is movable by the actuator using a lever system (37), said lever system (37) includes a first lever (38) and a second lever (39) preloaded relative to one another, wherein the second lever (39) of the lever system is able to be set by a control disk (50), said control disk is able to be driven by the actuator, in particular an electric motor.

12. The locking device as claimed in claim 11, wherein a first lever (38) of the lever system (37) is operatively connected to one of said at least one grip.

13. The locking device as claimed in claim 12, wherein said second lever (39) of the lever system is able to be set by a control disk (50), said control disk is able to be driven by the actuator, in particular an electric motor (54).

14. The locking device as claimed in claim 11, wherein the control disk (50) has a recess (49), in which a pin (48) arranged on one end (47) of said one of said levers (39) engages.

15. The locking device as claimed in claim 11, wherein the control disk (50) has an outer contour (57), with which the coupling lever (35), in particular by a coupling lever pin (36) arranged on the coupling lever (35), is able to be moved from one position into another position.

16. The locking device as claimed in claim 11, wherein the control disk (50) is able to be driven by the actuator in a geared-down manner.

17. The locking device as claimed in claim 11, wherein an end of the pawl (7) is acted upon by a locking cylinder, in particular by a connecting element.

18. The locking device as claimed in claim 11, wherein elongated holes (22, 27), in which pins (24, 29) of the connecting means are able to be moved longitudinally, formed in the ends (20, 25).

19. The locking device as claimed in claim 11, wherein a control disk (50) engaging the coupling lever (35) is able to be driven by the actuator in a geared-down manner.

20. The locking device as claimed in claim 11, wherein said coupling lever (35) is operatively connected to said actuating lever and said pawl.

21. A locking device, in particular for a vehicle, having a rotary catch (1), which encloses a locking bolt (2) and is able to be arrested or released by a movable pawl (7), the pawl (7) being actuable by at least one grip, said at least one grip being an exterior handle or an interior handle grip, a lever being connected to said at least one grip by connecting elements and the lever also being connected to the pawl (7), wherein the lever is movably mounted about a fixed pivot (8), said at least one grip operatively acting on the lever, said lever being an actuating lever (17) having two ends (20,25) each connected to one of said at least one grip, by said connecting elements, wherein said connecting elements include first and second actuating rods (23,28), and a coupling lever (35), movable by an actuator, is connected on the movable pawl (7) or engageable on the movable actuating lever (17), wherein said coupling lever (35) is movable by the actuator using a lever system (37), said lever system (37) includes a first lever (38) and a second lever (39) preloaded relative to one another, and said first lever (38) of the lever system (37) is operatively connected to one of said at least one grip.

22. A locking device, in particular for a vehicle, having a rotary catch (1), which encloses a locking bolt (2) and is able to be arrested or released by a movable pawl (7), the pawl (7) being actuable by at least one grip, said at least one grip being an exterior handle or an interior handle grip, a lever being connected to said at least one grip by connecting elements and the lever also being connected to the pawl (7), wherein the lever is movably mounted about a fixed pivot (8), said at least one grip operatively acting on the lever, said lever being an actuating lever (17) having two ends (20,25) each connected to one of said at least one grip, by said connecting elements, wherein said connecting elements include first and second actuating rods (23,28), and a coupling lever (35), movable by an actuator, is connected on the movable pawl (7) or engageable on the movable actuating lever (17), wherein said coupling lever (35) is movable by the actuator using a lever system (37), said lever system (37) includes a first lever (38) and a second lever (39) preloaded relative to one another, wherein the second lever (39) of the lever system is able to be set by a control disk (50), said control disk is able to be driven by the actuator, in particular an electric motor.

* * * * *